July 26, 1960

R. MANTEUFEL 2,946,399

APPARATUS FOR THE SEPARATION OF MIXTURES
IN THE GASEOUS OR VAPOR PHASE STATE

Filed July 26, 1957

INVENTOR
ROLF MANTEUFEL,

BY Bailey, Stephens & Huettig
ATTORNEYS

United States Patent Office 2,946,399
Patented July 26, 1960

2,946,399

APPARATUS FOR THE SEPARATION OF MIXTURES IN THE GASEOUS OR VAPOR PHASE STATE

Rolf Manteufel, Frankfurt am Main, Germany, assignor to Deutsche Gold- und Silber-Scheideanstalt vormals Roessler, Frankfurt am Main, Germany Filed July 26, 1957, Ser. No. 674,503

Claims priority, application Germany July 28, 1956

3 Claims. (Cl. 183—2)

The present invention relates to an improved apparatus for the separation of gaseous or vaporized substances of different molecular weight and/or different effective kinetic cross-section and especially for the separation of isotopes.

The apparatus according to the invention is adapted for use in the separation process in which the vapor phase mixture to be separated is caused to issue from a nozzle like opening in an expanding jet and the latter is separated by an apertured diaphragm arranged across the path of its flow into a core portion which passes through the aperture enriched in the heavier component or components and a peripheral portion which is enriched in the lighter component or components. This separation process has been described in co-pending application S.N. 563,387, filed February 3, 1956, now abandoned. While this procedure provides satisfactory separation factors, it usually is carried out in a series of steps in which the quantities of gas obtained in separated core and peripheral portions of the gas stream are subjected to repeated separation in order to increase the separation factor. In addition, there was the problem to provide apparatus of low cost permitting high gas throughputs in which a plurality of separating elements composed of nozzle and apertured diaphragm are connected in parallel.

It is an object of the present invention to provide an improved apparatus of the latter type.

The improved apparatus according to the invention for the separation of vapor phase mixture which has proved especially suited for the separation of isotopes, in essence, consists of a pressure tight vessel containing at least three gas collecting chambers and a plurality of chambers arranged between the gas collecting chambers through which the gas collecting chambers are connected in a certain manner. The conducting chambers are, for example, arranged lamellarly and preferably have a narrow and extended shape.

Figure 1:
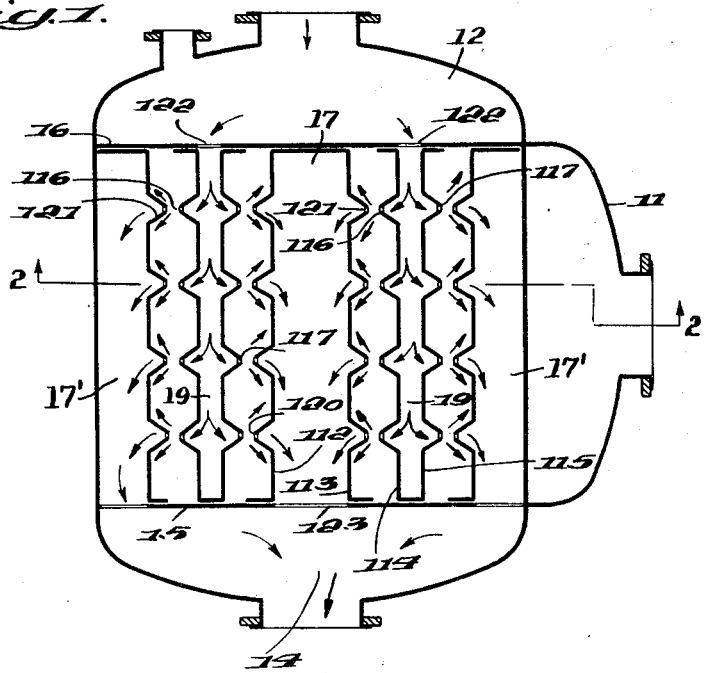

The accompanying drawing will serve to illustrate an embodiment of the apparatus according to the invention. In such drawing:

Fig. 1 diagrammatically shows a section through the apparatus; and

Figure 2:
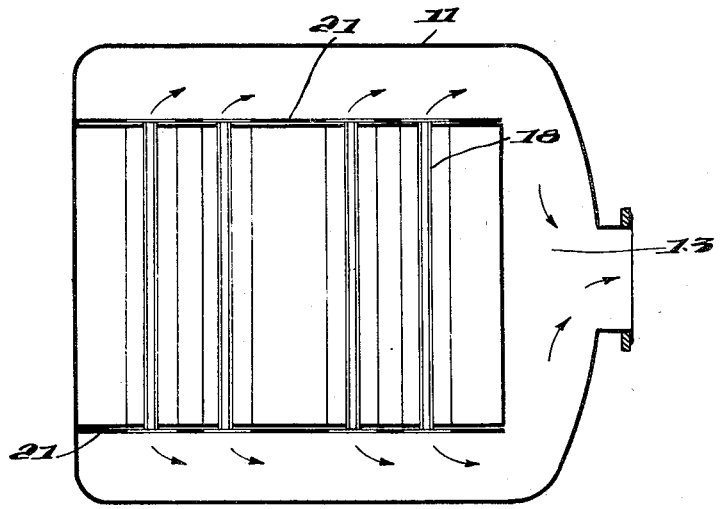

Fig. 2 is a further section through the apparatus taken along line 2—2 of Fig. 1.

In the drawing, 11 is a pressure tight vessel containing gas collecting chambers 12, 13 and 14 which are provided with means (not shown) for supplying or respectively withdrawing the gas mixture to be separated and the core and peripheral portions of the gas streams which are separated by the apertured diaphragms. A plurality of lamellar-like chambers 17, 18, 19 and 17' are arranged between apertured walls 15, 16 and 21. Walls 112, 113, 114 and 115 of these chambers are provided with openings 116, 117, 120 and 121. Each of the three adjacent chambers 17, 18 and 19 is connected to a different gas collecting chamber through the apertures provided in walls 15, 16 and 21. In addition the adjacent chambers communicate with each other through openings 116 and 117 which serve as nozzle openings and 120 and 121 which serve as diaphragm openings.

In the apparatus shown by way of example in the drawing, chamber 12 serves as the collecting chamber for the gas or vapor mixture to be separated which then enters chambers 19 through openings 122 in wall 16. The streams of gases which issue from nozzle openings 116 and 117 are separated by the opposed openings 120 and 121 so that the peripheral portions of the gas streams collect in chambers 18 and reach collecting chamber 13 as indicated in Fig. 2. The core portions of the gas streams which pass through openings 120 and 121 are collected in chambers 17 and 17' and then reach collecting chamber 14 through openings 123. The separated peripheral components and the core components can then be withdrawn from chambers 13 and 14 for further processing or ultimate use. In the apparatus shown, openings 116 and 117 operate as nozzles, whereas openings 120 and 121 are the apertures in the separating apertured diaphragms.

The connection between chambers 18 with gas collecting chamber 13 through apertured walls 21 is clearly discernable from Fig. 2.

According to an especially advantageous embodiment of the apparatus according to the invention which requires a low quantity of material per meter of slit length, the shape of one type of chamber, for example, chamber 18, is so selected that upon repetition of such chamber the shape and size of the adjacent chambers, for example, chambers 17 and 19, are defined thereby. It, however, is not necessary that the chambers, for example, chambers 18, have, when viewed as in Fig. 1, a hexagonal cross-section, as other suitable shapes, for example, circular shapes, quadrangles, rhombic shapes or sections thereof, can also be used depending upon the shape of the walls. The shape of such walls is to a certain extent dependent upon the shape of the openings therein serving as the nozzles and diaphragm apertures which are either in the form of extended slits or round openings. It is, of course, necessary that the cooperating nozzle openings and diaphragm apertures are of substantially the same geometrical shape. As the distance between the cooperating nozzle openings and diaphragm apertures is significant for the progress of the separation obtained, care must be taken that exact spacing be maintained between the individual walls carrying the nozzle openings and the diaphragm apertures.

In order to attain a shape which promotes the function of the openings contained in the walls serving as nozzle openings and diaphragm apertures and ensures the proper removal of the portions of the gas streams from chambers 18 and the like, it is expedient to profile such walls, for example, with ribs, waves or other projections which contain the bores or slits serving as the nozzle openings and diaphragm apertures on their raised portions. The profiled walls of the chambers according to the invention are arranged in such a manner that the same type of profiles, for example, the convex portions, stand opposite each other in adjacent walls and that every third wall has the profiles facing in the same direction.

The embodiment shown in the drawing is merely illustrative of a construction suitable for the apparatus according to the invention. The invention is, however, in no way limited to the form shown by way of example.

I claim:

1. An apparatus for the separation of vapor phase mixtures in which the mixture to be separated is caused to issue from a nozzle opening in the form of an expanding jet and such expanding jet is separated into a core portion and a peripheral portion by an apertured diaphragm arranged opposite to said nozzle opening comprising a pressure tight vessel containing a gas supply chamber and at least two gas collecting chambers and at least one series of three adjacent relatively narrow chambers separated from each other by apertured walls in which the apertures stand opposite each other, the first of said narrow chambers in said series being connected to the gas supply chamber and the second narrow chamber of said series being connected to one of said gas collecting chambers and the third narrow chamber of said series being connected to another of said gas collecting chambers, the apertures in the wall separating the first narrow chamber in said series from the second forming the nozzle like openings and the apertures in the wall separating the second and third narrow chambers in said series serving to separate the vapor phase mixture issuing from the opposite nozzle like openings into core and peripheral portions.

2. An apparatus according to claim 1 in which said pressure tight vessel contains a plurality of adjacent series of said three adjacent narrow chambers and in which the shape of one of said narrow chambers is such that upon spaced repetition of such chamber its side walls define the shape of the adjacent narrow chambers.

3. An apparatus according to claim 1 in which said pressure tight vessel contains a plurality of adjacent series of said three adjacent narrow chambers and in which the walls separating said narrow chambers are provided with concave and convex portions, the apertures being located in the concave portions of the adjacent walls defining the first of the narrow chambers of said series which is connected to the gas supply chamber and in which the concave and convex portions of each wall face the concave and convex portions respectively of the next adjacent wall and in which the alternate walls have their concave and convex portions facing in the same direction.

References Cited in the file of this patent
UNITED STATES PATENTS

| | | |
|---|---|---|
| 2,607,439 | Dickens et al. | Aug. 19, 1952 |
| 2,734,592 | Jones | Feb. 14, 1956 |